(No Model.) 2 Sheets—Sheet 1.
M. J. HOESCHEN.
LAND LEVELER.
No. 540,552. Patented June 4, 1895.
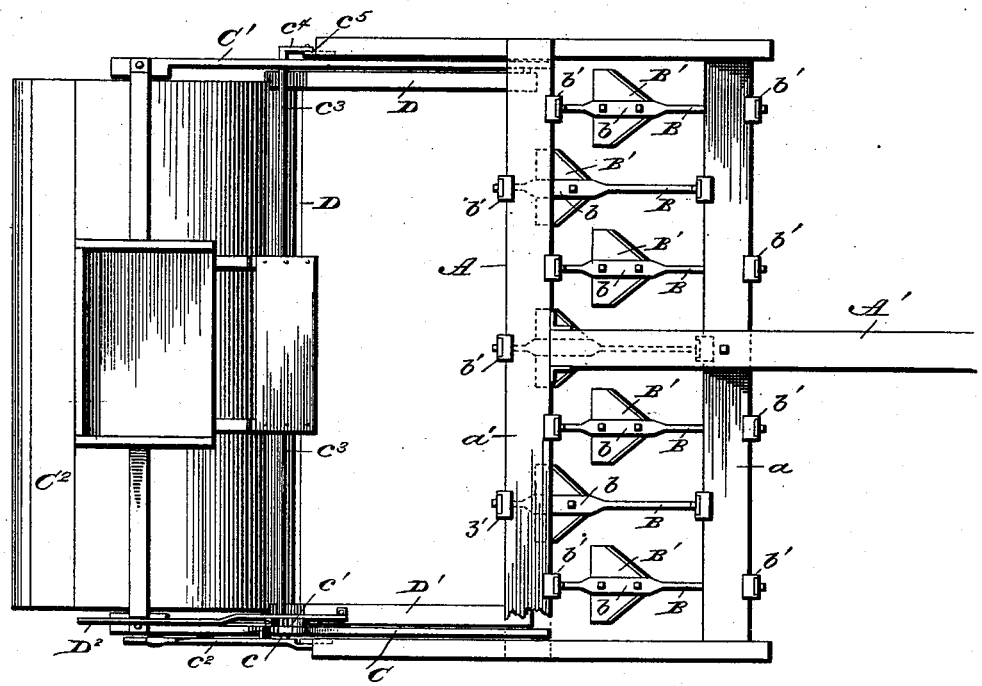
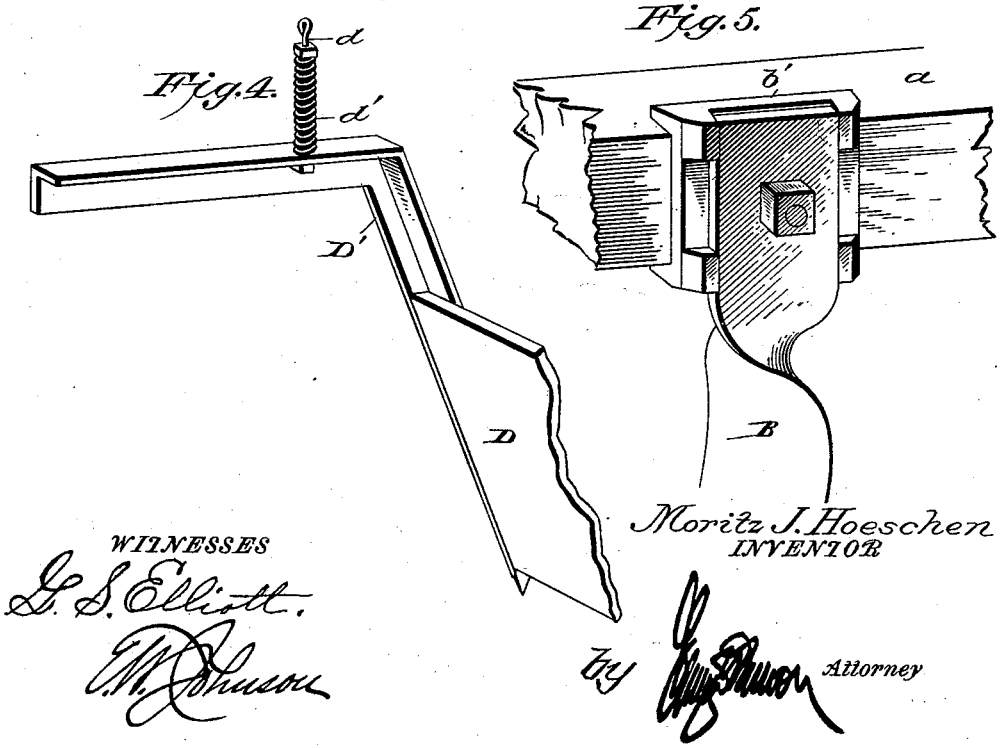
WITNESSES
Moritz J. Hoeschen
INVENTOR
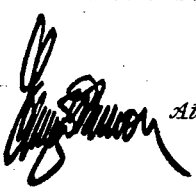 Attorney (No Model.)　　　　　　　　　　　　　　　　2 Sheets—Sheet 2.
M. J. HOESCHEN.
LAND LEVELER.
No. 540,552.　　　　　　　　　Patented June 4, 1895.
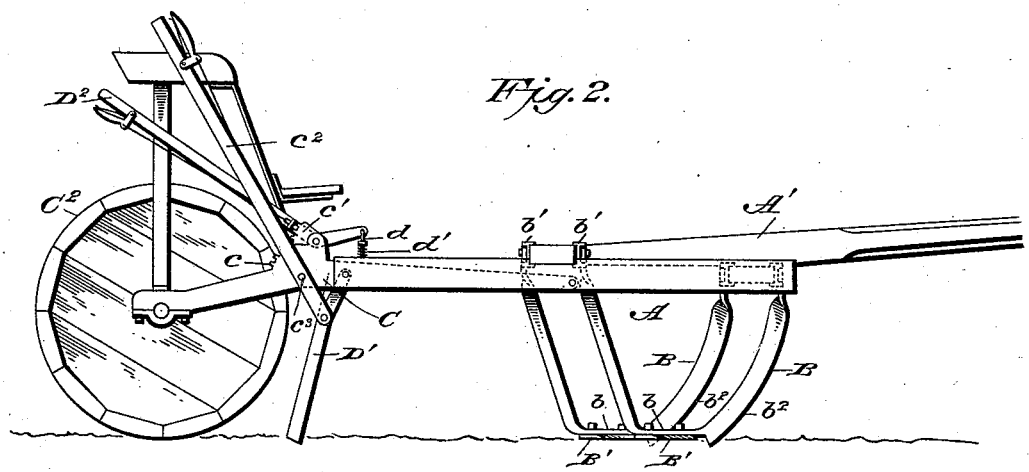
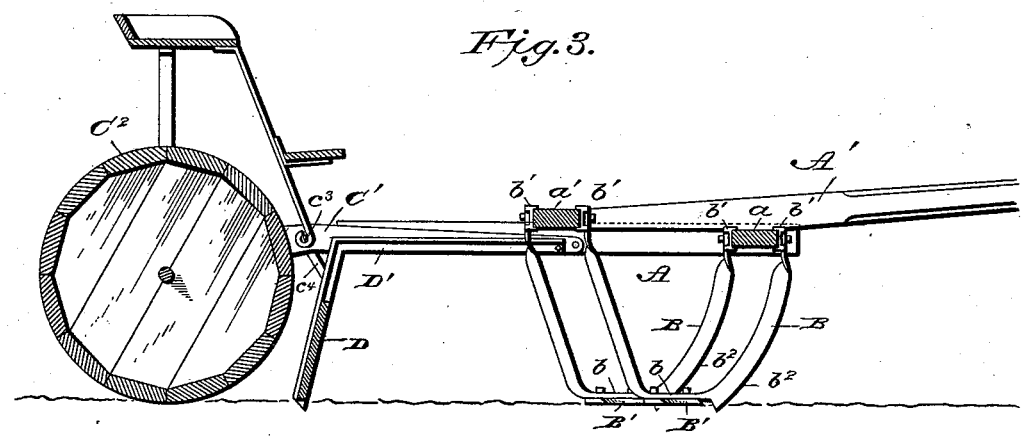

UNITED STATES PATENT OFFICE.

MORITZ J. HOESCHEN, OF FREEPORT, MINNESOTA.

LAND-LEVELER.

SPECIFICATION forming part of Letters Patent No. 540,552, dated June 4, 1895.

Application filed November 1, 1894. Serial No. 527,645. (No model.)

*To all whom it may concern:*

Be it known that I, MORITZ J. HOESCHEN, a citizen of the United States of America, residing at Freeport, in the county of Stearns and State of Minnesota, have invented certain new and useful Improvements in Land-Levelers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an agricultural implement of improved construction by means of which sod or turf can be cut, the sod cutters being followed by a leveling board and roller by means of which meadow lands can be quickly leveled; and the invention consists in the construction and combination of the parts, as will be hereinafter fully set forth and specifically pointed out in the claims.

In the accompanying drawings, Figure 1 is a plan view of a land-leveler constructed in accordance with my invention. Fig. 2 is a side elevation. Fig. 3 is a sectional view. Fig. 4 is a detail perspective view of the leveling-board, and Fig. 5 is a detail perspective view showing the manner of attaching to the frame the bars which carry the flat cutters or scarifiers.

A designates the front portion of the main frame which has rigidly attached thereto cross-beams $a\ a'$, the draft tongue $A'$ being secured to the center of these cross-beams which are preferably of the same width; for by such construction the bars which carry the cutters or scarifiers and the connecting fixtures may all be of the same pattern.

B B designate curved bars which are shaped as shown to provide a flat central portion $b$ to which the horizontal cutters or scarifiers $B'$ are bolted. The upper ends of the bars B are given a half turn to bring them on a line with the edges of the beams $a\ a'$ to which they are secured by means of castings or fixtures $b'$ and bolts as shown in Fig. 5, said castings having lugs which lie over the upper and lower edges of the beams $a\ a'$, and oppositely projecting lugs within which lie the ends of the bars B. The castings and bars may be held in place by a single bolt and nut or by a lag screw. The front edge of the forward portion $b^2$ of the bars B is sharpened to cut the sod before it is acted upon by the cutters or scarifiers $B'$.

To the side beams of the frame A preferably beneath the transverse beam $a'$ are pivoted rearwardly extending bars C C' to the rear ends of which is journaled a land roller $C^2$ of ordinary construction, the bars C C' also serving to support the frames which carry the driver's seat. The bar C is provided with segmental racks $c\ c'$, and adjacent to the rack $c$ is pivoted a lever $c^2$ the lower end of which extends below the bar C and is provided with a link for connecting the same to the end of one of the side bars of the main frame. The lever $c^2$ is fulcrumed on one end of a shaft $c^3$ which passes through the side bars C C', the other end of said shaft having a crank-arm $c^4$ which is connected to the other side bar of the main frame by a link $c^5$ so that when the shaft is rocked by the lever the depth of the cut will be varied, the lever being locked in an adjusted position by causing the sliding catch thereon to engage the segment rack $c$. This rock-shaft may also serve as a support for the front standards of the seat carrying frame.

D designates a leveling board which is rigidly attached to the bent angle bars $D'$, the forward ends of said bars being pivotally attached to the bars C C' which carry the roller. One of the angle bars $D'$ is provided with a bolt $d$ which is encircled by a spring $d'$, the upper end of the bolt being formed into an eye which engages with the short end of a lever $D^2$ which is fulcrumed adjacent to the segment rack $c'$, and by adjusting this lever $D^2$ the leveling board can be depressed so that it may carry a part of the weight of the machine, or it may be raised so as to only lightly contact with the soil. The lower end of the bolt $d$ is provided with a head upon which rests the angle bar D, the bar being held in place by the spring. By this arrangement the leveling board may release itself when obstructed but can cut no deeper than adjusted by lever $D^2$.

By means of an implement constructed as hereinbefore described sods or turf can be cut or the ground scarified, leveled and rolled at a single operation, and by reason of the points on the front portions of the bars B, which extend below the cutters or blades B' no grass or weeds will be gathered by said blades, and by curving the front portions of the bars rearwardly they will ride over an obstruction, the downwardly extending points always protecting the horizontal cutters or blades.

By providing the curved bars B the machine will never clog as blocks of sod or turf will readily pass through to the leveling board, and the board will take the sods with it until a low place is reached and drop them so that they will be rolled down. The implement is therefore useful in leveling fields which have been cultivated to leave hills and furrows.

It will be noted that by removing the cutters or blades B' and the side bars C C' which carry the roller and leveling board the machine may be used as a cultivator or pulverzier in which case the roller may be used to weigh the implement down by being placed on top. It will also be understood that in operating the complete machine the roller carries the machine and thus permits the same to operate easily, the roller also forming means for guiding the cutter portion of the machine to run it steady and evenly over the ground and prevents it sluing sidewise if obstructed by grubs.

Having thus described my invention, what I claim as new, and desire to secure by Letters Patent, is—

1. In an agricultural implement, the combination, of a frame A having a draft tongue and transverse beams, of curved bars B attached to the transverse beams at their upper ends and provided with front cutting edges and horizontal blades or scarifiers B', which are attached to the lower portion of the bars B so as to extend on each side of said bars a roller and seat carrying frame pivoted to the frame A, and a leveling board pivoted to the frame A, the parts being organized substantially as shown and for the purpose set forth.

2. In combination with the frame A having parallel cross-bars $a$ and $a'$ to which curved bars with flat blades or scarifiers are attached, a roller carrying frame pivoted to the side bars of the frame A, a leveling board pivoted to the roller carrying frame in front of the roller, and adjusting levers fulcrumed on the roller carrying frame, substantially as shown and for the purpose set forth.

3. In an agricultural implement for the purpose set forth, the combination, of a frame having scarifying blades, a roller frame pivoted thereto, segment-racks $c\ c'$ attached to one of the side bars of the roller frame, a frame carrying a leveling board pivoted to the side bars of the roller frame levers $c^2$ and $D^2$ connected to the roller frame adjacent to the segment-racks $c\ c'$ and having sliding catches which engage therewith, and means for connecting said levers with the blade carrying frame and the frame of the leveling board, substantially as shown.

In testimony whereof I affix my signature in presence of two witnesses.

MORITZ J. HOESCHEN.

Witnesses:
CASPAR SCHULTE,
HENRY BENOLKEN.